(12) United States Patent
Everhart et al.

(10) Patent No.: US 8,945,455 B2
(45) Date of Patent: Feb. 3, 2015

(54) RECONFIGURABLE SHAPE MEMORY POLYMER SUPPORT TOOLING

(75) Inventors: Joel James Everhart, Xenia, OH (US); Thomas Wood Margraf, Centerville, OH (US); David E. Havens, Bellbrook, OH (US)

(73) Assignee: Spirit AeroSystems, Inc., Wichita, KS (US)

(*) Notice: Subject to any disclaimer, the term of this patent is extended or adjusted under 35 U.S.C. 154(b) by 455 days.

(21) Appl. No.: 13/288,393

(22) Filed: Nov. 3, 2011

(65) Prior Publication Data

US 2012/0119411 A1 May 17, 2012

Related U.S. Application Data

(60) Provisional application No. 61/412,627, filed on Nov. 11, 2010.

(51) Int. Cl.
*B29C 33/38* (2006.01)
*B29C 33/48* (2006.01)
*B29C 33/04* (2006.01)

(52) U.S. Cl.
CPC ............. *B29C 33/485* (2013.01); *B29C 33/046* (2013.01)
USPC ........... 264/313; 264/219; 264/220; 264/230; 264/267; 425/393; 425/403; 425/460

(58) Field of Classification Search
CPC .... B29C 33/38; B29C 33/3828; B29C 33/40; B29C 2033/38
USPC ............ 425/460, 42, 403, 393; 264/219, 267, 264/230, 220, 313
See application file for complete search history.

(56) References Cited

U.S. PATENT DOCUMENTS 1,929,673 A * 10/1933 Cammen ..................... 242/573.9
3,425,642 A    2/1969  May (Continued)

FOREIGN PATENT DOCUMENTS

CN    101041269    9/2007
CN    101055344    10/2007

(Continued)

OTHER PUBLICATIONS

Essemplex Thermoplastic Shape Memory Polymer Resin; Product Data Sheet; Copyright 2007. CRG Industries; http://www.crg-industries.com/datasheets/Essemplex%20data%20sheet.pdf.

(Continued)

*Primary Examiner* — Timothy Kennedy
(74) *Attorney, Agent, or Firm* — Hovey Williams LLP

(57) ABSTRACT

A support apparatus and method for providing structural support to a shape memory polymer (SMP) apparatus during fabrication of composite parts. The support apparatus may comprise an adjustable, rigid structural member and a plurality of SMP support components transitionable between a rigid and malleable state and fixed to an outer surface of the rigid structural member. The rigid structural member may extend in at least one cross-sectional dimension toward the SMP apparatus, pressing the SMP support components, in their malleable state, against the SMP apparatus. The SMP support components may thereby conform to a first surface of the SMP apparatus, then return to their rigid state while pressed against the SMP apparatus, thus providing a rigid load path between the SMP apparatus and the rigid structural member. Then composite material may be applied to a second surface of the SMP apparatus, opposite of the first surface.

25 Claims, 5 Drawing Sheets

(56) References Cited

U.S. PATENT DOCUMENTS

| | | |
|---|---|---|
| 3,677,684 A * | 7/1972 | Platz .................................. 425/469 |
| 3,764,641 A | 10/1973 | Ash |
| 3,989,439 A * | 11/1976 | Schmitzberger .............. 425/393 |
| 4,632,328 A | 12/1986 | Bishop et al. |
| 5,049,591 A | 9/1991 | Hayashi et al. |
| 5,057,252 A | 10/1991 | Kagawa et al. |
| 5,098,776 A | 3/1992 | Kobayashi et al. |
| 5,128,197 A | 7/1992 | Kobayashi et al. |
| 5,139,832 A | 8/1992 | Hayashi et al. |
| 5,151,277 A | 9/1992 | Bernardon et al. |
| 5,168,635 A | 12/1992 | Hoffman |
| 5,445,342 A | 8/1995 | Miller et al. |
| 5,546,784 A | 8/1996 | Haas et al. |
| 5,846,464 A | 12/1998 | Hoffman |
| 5,851,563 A | 12/1998 | Hoffman |
| 5,914,081 A | 6/1999 | Shevchuk |
| 5,954,175 A | 9/1999 | Haas et al. |
| 6,012,314 A | 1/2000 | Sullivan et al. |
| 6,053,026 A | 4/2000 | Nardiello et al. |
| 6,083,442 A | 7/2000 | Gabilly |
| 6,102,933 A | 8/2000 | Lee et al. |
| 6,160,084 A | 12/2000 | Langer et al. |
| 6,363,767 B1 | 4/2002 | Papazian et al. |
| 6,370,757 B2 | 4/2002 | Lee et al. |
| 6,388,043 B1 | 5/2002 | Langer et al. |
| 6,701,764 B2 | 3/2004 | Bruck et al. |
| 6,720,402 B2 | 4/2004 | Langer et al. |
| 6,759,481 B2 | 7/2004 | Tong |
| 6,827,325 B2 | 12/2004 | Hofmann et al. |
| 6,830,712 B1 | 12/2004 | Roffman et al. |
| 6,852,825 B2 | 2/2005 | Lendlein et al. |
| 6,858,680 B2 | 2/2005 | Gunatillake et al. |
| 6,910,714 B2 | 6/2005 | Browne et al. |
| 6,920,675 B2 | 7/2005 | Browne et al. |
| 6,979,050 B2 | 12/2005 | Browne et al. |
| 6,986,855 B1 | 1/2006 | Hood et al. |
| 6,991,280 B2 | 1/2006 | McKnight et al. |
| 7,013,536 B2 | 3/2006 | Golden et al. |
| 7,029,044 B2 | 4/2006 | Browne et al. |
| 7,029,056 B2 | 4/2006 | Browne et al. |
| 7,032,282 B2 | 4/2006 | Powell et al. |
| 7,059,664 B2 | 6/2006 | Aase et al. |
| 7,060,140 B2 | 6/2006 | Cheng et al. |
| 7,063,377 B2 | 6/2006 | Brei et al. |
| 7,067,606 B2 | 6/2006 | Mather et al. |
| 7,091,297 B2 | 8/2006 | Mather et al. |
| 7,105,117 B2 | 9/2006 | Rodgers et al. |
| 7,108,316 B2 | 9/2006 | Barvosa-Carter et al. |
| 7,118,652 B2 | 10/2006 | McKnight et al. |
| 7,146,690 B2 | 12/2006 | Stanford, Jr. et al. |
| 7,147,269 B2 | 12/2006 | Aase et al. |
| 7,147,271 B2 | 12/2006 | Aase et al. |
| 7,178,859 B2 | 2/2007 | Browne et al. |
| 7,188,498 B2 | 3/2007 | Browne et al. |
| 7,200,902 B2 | 4/2007 | Browne et al. |
| 7,204,472 B2 | 4/2007 | Jones et al. |
| 7,217,744 B2 | 5/2007 | Lendlein et al. |
| 7,252,313 B2 | 8/2007 | Browne et al. |
| 7,267,367 B2 | 9/2007 | Barvosa-Carter et al. |
| 7,276,195 B1 | 10/2007 | Tong |
| 7,284,786 B2 | 10/2007 | Browne et al. |
| 7,308,738 B2 | 12/2007 | Barvosa-Carter et al. |
| 7,309,104 B2 | 12/2007 | Browne et al. |
| 7,331,616 B2 | 2/2008 | Brei et al. |
| 7,332,688 B2 | 2/2008 | Browne et al. |
| 7,350,851 B2 | 4/2008 | Barvosa-Carter et al. |
| 7,370,894 B2 | 5/2008 | Browne et al. |
| 7,392,876 B2 | 7/2008 | Browne et al. |
| 7,401,845 B2 | 7/2008 | Alexander et al. |
| 7,401,846 B2 | 7/2008 | Browne et al. |
| 7,422,714 B1 | 9/2008 | Hood et al. |
| 7,429,074 B2 | 9/2008 | McKnight et al. |
| 7,448,678 B2 | 11/2008 | Browne et al. |
| 7,455,147 B2 | 11/2008 | Browne et al. |
| 7,478,845 B2 | 1/2009 | Mankame et al. |
| 7,480,975 B2 | 1/2009 | Verbrugge et al. |
| 7,484,735 B2 | 2/2009 | Verbrugge et al. |
| 7,498,926 B2 | 3/2009 | Browne et al. |
| 7,500,704 B2 | 3/2009 | Herrera et al. |
| 7,538,472 B2 | 5/2009 | Browne et al. |
| 7,556,117 B2 | 7/2009 | Browne et al. |
| 7,556,313 B2 | 7/2009 | Browne et al. |
| 7,587,805 B2 | 9/2009 | Browne et al. |
| 7,591,834 B2 | 9/2009 | Buckley et al. |
| 7,594,259 B1 | 9/2009 | Audet et al. |
| 7,594,697 B2 | 9/2009 | Browne et al. |
| 7,597,616 B2 | 10/2009 | Browne et al. |
| 7,601,274 B2 | 10/2009 | Mather et al. |
| 7,607,634 B2 | 10/2009 | Browne et al. |
| 7,607,717 B2 | 10/2009 | Browne et al. |
| 2003/0055198 A1 | 3/2003 | Langer et al. |
| 2004/0011525 A1 | 1/2004 | Jones et al. |
| 2004/0014929 A1 | 1/2004 | Lendlein et al. |
| 2004/0015187 A1 | 1/2004 | Lendlein et al. |
| 2004/0033515 A1 | 2/2004 | Cao et al. |
| 2004/0033553 A1 | 2/2004 | Littarru et al. |
| 2005/0211870 A1 | 9/2005 | Browne et al. |
| 2005/0212630 A1 | 9/2005 | Buckley et al. |
| 2005/0244353 A1 | 11/2005 | Lendlein et al. |
| 2006/0115799 A1 | 6/2006 | Stephen et al. |
| 2006/0116503 A1 | 6/2006 | Lendlein et al. |
| 2006/0140999 A1 | 6/2006 | Lendlein et al. |
| 2006/0287710 A1 | 12/2006 | Lendlein et al. |
| 2007/0088135 A1 | 4/2007 | Lendlein et al. |
| 2007/0129784 A1 | 6/2007 | Lendlein et al. |
| 2008/0021166 A1 | 1/2008 | Tong et al. |
| 2008/0021188 A1 | 1/2008 | Tong et al. |
| 2008/0023890 A1 | 1/2008 | Sherman et al. |
| 2008/0085946 A1 | 4/2008 | Mather et al. |
| 2008/0228028 A1 | 9/2008 | Carlson et al. |
| 2008/0236720 A1 | 10/2008 | Sigler et al. |
| 2008/0262188 A1 | 10/2008 | Xie et al. |
| 2008/0269420 A1 | 10/2008 | Tong et al. |
| 2008/0272615 A1 | 11/2008 | McKnight et al. |
| 2008/0314510 A1 | 12/2008 | Hood |
| 2008/0315466 A1 | 12/2008 | Hood et al. |
| 2009/0023827 A1 | 1/2009 | Lendlein |
| 2009/0036627 A1 | 2/2009 | Lendlein et al. |
| 2009/0047489 A1 | 2/2009 | Grummon et al. |
| 2009/0065650 A1 | 3/2009 | McKeon et al. |
| 2009/0092807 A1 | 4/2009 | Hu et al. |
| 2009/0095865 A1 | 4/2009 | Everhart et al. |
| 2009/0131604 A1 | 5/2009 | Lendlein |
| 2009/0163664 A1 | 6/2009 | Lendlein et al. |
| 2009/0176896 A1 | 7/2009 | Lendlein |
| 2009/0240075 A1 | 9/2009 | Mather et al. |

FOREIGN PATENT DOCUMENTS

| | | |
|---|---|---|
| EP | 2075279 | 1/2009 |
| WO | WO2005108448 | 11/2005 |
| WO | WO2005118248 | 12/2005 |
| WO | WO2006046974 | 5/2006 |
| WO | WO2007001407 | 1/2007 |
| WO | WO2007002161 | 1/2007 |
| WO | WO2007070877 | 6/2007 |
| WO | WO2008051241 | 5/2008 |
| WO | WO2008108863 | 9/2008 |
| WO | WO2009002586 | 12/2008 |

OTHER PUBLICATIONS

CRG—Veriflex Shape Memory Polymer; Advanced materials Portfolio; Veriflex Shape Memory Polymer; http://verilyte.com/technology/materialsportfolio/veriflex.shtml; Copyright 2003-2011 Cornerstone Research Group, Inc. Copyright Dec. 12, 2003.

SAO/NASA ADS Physics AbstractService; Shape Memory Polymer Configuration Tooling; http://adsabs.harvard.ed/abs/2004SPIE.5388...87E; Published Jul. 2004.

CM; Composites Manufacturing; The Official magazine of the American Composites Manufacturers Association; Article: Trapped Tooling; Building the Unbuildable, New designs, new tooling materials, new approaches. By: Linda Clements; Published Jun. 2005.

(56) References Cited

OTHER PUBLICATIONS

AFRL-AM-WP-TP-2006-406; "High-Temperature Reuasble Shape Memory Polymer Mandrels" (Preprint); By: Matthew C. Everhart and Beth A. Knapp; Mar. 2006; Airforce Research Laboratory.

Scientific Paper; "High-Temperature Reusable Shape Memory Polymer Mandrels"; by: Matthew C. Everhart, DaAnna L. Harris, David M. Nickerson and Richard D. Hreha; Cornerstone Research Group, Inc., 2750 Indian Ripple Road, Dayton, Ohio 45440; Published Mar. 30, 2006.

High-Performance Composites; Design and Manufacturing Solutions for Industry; Published Jul. 2006; www.compositesworld.com; "New tooling concepts spur innovation."

Article from High-Performance Composites Jul. 2006; By: Sara Block; Tooling and Toolmaking Innovations Continue; Posted Jul. 1, 2006; Tooling and Toolmaking Innovations Continue : Composites World.

American Composites Manufacturers Association (ACMA)—Feature: Article : "Morphing: The Shape of Wings to Come" By: Chris Red; Published Jul. 26, 2006; http://www.acmanet.org/CM/0706/feature_d0706.cfm.

E-news; National Composites Network; "Cornerstone Research Group: Shape Memory Polymers"; NCN website: www.ncn-uk.co.uk; Published Sep. 2006.

CRG Industries; For Immediate Release; Published Jan. 22, 2007; "CRG Industries presents our award-winning Smart-Mandrels Tubes, winner of SPIE 2005 Smart materials and Structures Award."

Materials Science and Technology Polymers; Shape memory polymers detect changes in temperature or light level; Technical Contact: Linda Domeier; Science Matter Contact: Alan Burns, Ph.D.; Published Jun. 2007; LDRD: Laboratory Directed Research and Development; Sandia National Laboratories.

SAMPE 2007 Baltimore : Composites World; SAMPE 2007 Baltimore; The SAMPE Symposium's cross-country move proves a welcome boon to East Coast suppliers and composites professionals; Article From: High-Performance Composites Jul. 2007; Staff; Posted on Jul. 1, 2007; http://www.compositesworld.com/articles/sampe-2007-baltimore.

Shape memory Polymer Bladder Tooling; Navy SBIR RY2008.1; http://www.navysbir.com/08_1/81.htm; published Jul. 13, 2007.

CRG—SMP Bladders; Manufacturing Technology Portfolio; Shape Memory Polymer (SMP) Bladders for Composites Manufacturing; http://www.crgrp.com/technology/mantechportolio/smp-bladders.shtml; Published Jul. 13, 2007.

SAMPE Fall Technical Conference and Exhibition; Oct. 29-Nov. 1, 2007; Cincinnati, Ohio,Cincinnati Hilton Netherland Plaza, Sponsored by SAMPE's Midwest Chapter; From Art to Science: Advancing Materials and Process Engineering; Published Jul. 19, 2007.

Reinforced Plastics—Preview: Composites 2007; Reinforced Plastics.com; Feature Preview: Composites 2007; Aug. 31, 2007; Reinforced Plastics; http://www.reinforcedplastics.com/view/3605/preview-composites-2007-/; p. 4.

Elastic Memory Composite (EMC) Material; Composite Technology Development, Inc: Engineered Material Solutions; Products; TEMBO Shape Memory Polymers and Elastic Memory Composites; http://www.ctd_materials.com/products/emc.htm; Published Oct. 2, 2007.

Technical Paper : Model Development for Shape Memory Polymers; Ryan D. Siskind and Ralph C. Smith; Department of Mathematics; North Carolina State University; Raleigh, NC 27695; Published 2008; http://www.ncsu.edu/crsc/reports/ftp/pdf/crsc-tr08-04.pdf.

Paper : Shape Memory Polymers; Published Oct. 8, 2008; http://www.plasticsprojects.org/Shape%20Memory%2010-12.pdf.

CRG—Shape Memory Polymer Nanocomposites: Multifunctional Materials for Revolutionary Applications; Power Point Presentation; Published Mar. 17, 2005.

SMP Bladders : Advanced Composite Tooling : Operate first as mandrels and later as inflatable bladders; CRG sales sheet; Copyright 2007.

\* cited by examiner

RECONFIGURABLE SHAPE MEMORY POLYMER SUPPORT TOOLING

RELATED APPLICATIONS

The present utility patent application claims priority benefit, with regard to all common subject matter, of earlier-filed U.S. provisional patent application titled "Reconfigurable Shape Memory Polymer Tooling Support" Ser. No. 61/412,627, filed Nov. 11, 2010, hereby incorporated in its entirety by reference into the present application.

BACKGROUND

1. Field

The present invention relates to systems and methods for structurally supporting an apparatus made of shape memory polymer (SMP) to fabricate composite parts.

2. Related Art

Composite parts, such as those used in the manufacture of aircraft, can be constructed using various production methods, such as filament winding, tape placement, overbraid, chop fiber roving, coating, hand lay up, or other composite processing techniques and curing processes. Most of these processes use a rigid cure tool/mandrel on which composite material is applied and then cured into a rigid composite part. Removing the mandrel from the cured composite part is generally difficult, costly, and/or time-consuming, particularly if the resulting composite part has trapping geometry that precludes easy part removal.

One known method of removing the mandrel requires sacrificing or destroying the mandrel by cutting, dissolving, bead-blasting, or otherwise breaking down the mandrel into smaller pieces which can be removed from within the composite part. Destroying the mandrel obviously prevents it from being used again for subsequent parts and can be damaging to an inner surface of the composite part.

Another method of removing the mandrel uses a segmented mandrel that can be disassembled and removed after the composite part is cured. However, these mandrels are expensive and require a great amount of time to install and remove. Furthermore, these segmented mandrels are typically each designed to fabricate a specific composite part and are not easily reconfigured to be used in the manufacture of other composite parts.

Yet another method uses inflatable mandrels that can be removed by deflating them after the composite part is cured. However, this method typically involves balloon-like mandrels that can only be used as a bagging aid due to their relative lack of strength and rigidity during composite lay-up.

Insertion of various supports within the mandrel could be used to provide strength and rigidity during composite lay-up. For example, pogo pin or bed-of-nails apparatuses can be configured to provide structural load support to a thin material. However, because some mandrels or other composite material lay-up tooling are thin, these types of point load supports can cause undesired sagging or deforming of the mandrel or tooling between support points.

Accordingly, there is a need for an improved method of forming a composite part that does not suffer from the above limitations.

SUMMARY

Embodiments of the present invention provide a method and support apparatus for structurally supporting a mold, tooling, or shape memory polymer (SMP) apparatus during fabrication of a composite part. The support apparatus may comprise an adjustable rigid structural member and a plurality of SMP support components spaced apart from each other and fixed to an outer surface or end portion of the rigid structural member. The adjustable rigid structural member may have an adjustable cross-sectional dimension. The SMP support components may comprise shape memory polymer and may be configured to transition between a rigid state and a malleable state. The SMP support components may also be independently deformable in the malleable state when pressure is applied thereto.

According to another embodiment of the invention, the support apparatus may comprise an adjustable rigid structural member, a plurality of SMP support components spaced apart from each other and fixed to an outer surface or end portion of the rigid structural member, and an SMP apparatus having a first surface and a second surface opposite the first surface. The adjustable rigid structural member may have an adjustable cross-sectional dimension. Specifically, the rigid structural member may be adjustable between a first configuration and a second configuration. At least one of the cross-sectional dimensions of the rigid structural member is greater in the second configuration than in the first configuration. The SMP support components may comprise shape memory polymer and may be configured to transition between a rigid state at a temperature below $T_g$ and a malleable state at a temperature above $T_g$. The SMP support components may also be independently deformable in the malleable state when mechanical force is applied thereto. The second surface of the SMP apparatus may be configured to have uncured composite material applied thereto. Furthermore, at least some of the SMP support components may be pressed against the first surface of the SMP apparatus when the rigid structural member is in the second configuration, such that the SMP support components provide a structural load path from the SMP apparatus to the rigid structural member.

A method of the present invention may comprise forming a composite part on an SMP apparatus composed of shape memory polymer (SMP). Specifically, the method may comprise a step of placing a support apparatus proximate to at least one surface of the SMP apparatus. The support apparatus may comprise an adjustable, rigid structural member having adjustable cross-sectional dimensions and a plurality of shape memory polymer (SMP) support components spaced apart from each other and fixed to an outer surface or end portion of the adjustable rigid structural member. The SMP support components may be configured to transition between a rigid state and a malleable state and to be independently deformable in the malleable state when mechanical force is applied thereto. The method may further comprise the steps of triggering the SMP support components from the rigid state into the malleable state and actuating the rigid structural member to increase in at least one cross-sectional dimension, such that the SMP support components are pressed against at least one surface of the SMP apparatus. Next, the method may comprise the steps of triggering the SMP support components from the malleable state to the rigid state while the SMP support components are pressed against the at least one surface of the SMP apparatus, thus providing a rigid load path between the SMP apparatus and the rigid structural member, and applying uncured composite material to a surface of the SMP apparatus opposite of the surface of the SMP apparatus in contact with the SMP support components.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

DESCRIPTION OF DRAWING FIGURES

Embodiments of the present invention are described in detail below with reference to the attached drawing figures, wherein.

Figure 1:
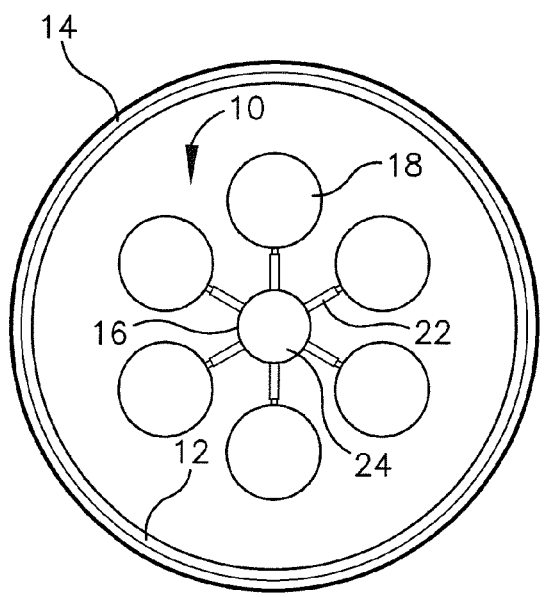
FIG. 1 is an end view of a support apparatus of constructed in accordance with an embodiment of the present invention and illustrated in a first configuration.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
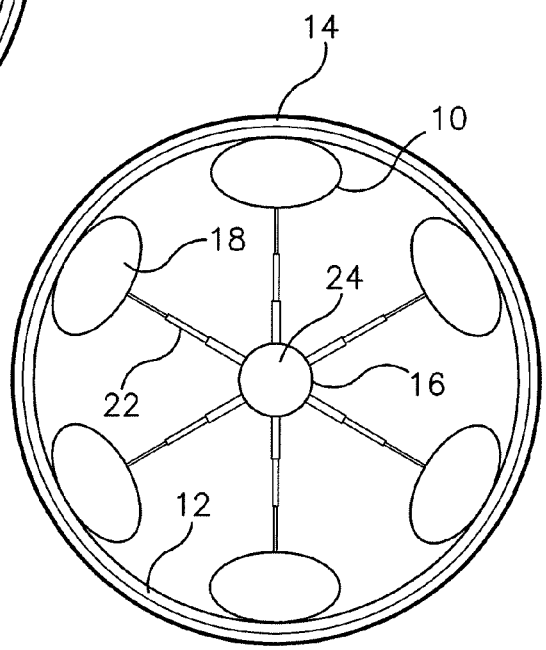
FIG. 2 is an end view of the support apparatus of FIG. 1 in a second configuration.

A support apparatus 10 constructed in accordance with a first embodiment of the invention is illustrated in FIGS. 1 and 2. The support apparatus 10 is configured to provide structural support to any apparatus, such as a mold, tooling, or a shape memory polymer (SMP) apparatus 12. For example, the SMP apparatus 12 may be any of the SMP apparatuses described in the following co-pending U.S. Patent Applications: U.S. application Ser. No. 13/238,695; U.S. application Ser. No. 13/238,879; U.S. application Ser. No. 13/238,733; U.S. application Ser. No. 13/238,841, and U.S. application Ser. No. 13/238,775, each incorporated herein by reference in their entirety.

The SMP apparatus 12, as described in these incorporated applications, generally must be thin enough to form effectively, but also stiff enough to resist deflecting under out-of-plane loading imposed by the force of automated composite lay-up equipment such as filament winders and tape laying machines. It is also generally desirable for the SMP apparatus 12 to have sufficient structural stiffness to resist bending under its own weight and the weight of the composite material placed thereon. The need for the SMP apparatus 12 to be thin for forming conflicts with the structural stiffness requirements for composite material application. Thus, the support apparatus 10 is designed to structurally support the SMP apparatus 12 for forming a composite part so that the SMP apparatus 12 does not collapse under the weight of the composite material 14 or the pressure or mechanical force applied when placing the composite material 14 on the SMP apparatus 12, while still keeping the thickness of the SMP apparatus 12 small enough that it can be shaped as required in its malleable state.

As illustrated in FIGS. 1 and 2, the composite material 14 is configured to be placed on the SMP apparatus 12 to form the composite part and may comprise or be in the form of prepreg, wet processed fiber, dry fiber, continuous fiber, discontinuous fiber, chopped fiber, low temperature resin, high temperature resin, toughened resin, glass, KEVLAR, carbon, and/or core. Furthermore, the chemical makeup of the composite material 14 may include epoxy, BMI, benzoxazine, and other similar substances known in the art. The composite material 14 may be placed onto the SMP apparatus 12 using automated fabric placement, automated fiber placement, automated filament winding, fabric placement, hand lay-up, or any other method known in the art. The composite material 14 may be configured to be hardened or cured, such as in an autoclave, out of an autoclave, via a low-temperature cure process, and/or via a high-temperature cure process.

The support apparatus 10 may be configured to contact a surface of the SMP apparatus 12 opposite of a surface to which the composite material 14 is applied. For example, if the SMP apparatus 12 is used as a mandrel for composite lay-up, as illustrated in FIGS. 1-2, the support apparatus 10 may be configured to rest inside the SMP apparatus 12 as an inner mandrel or inner structural support.

The support apparatus 10 may comprise at least one rigid structural member 16 and one or more SMP support components 18 fixed to various surfaces of the structural member 16 and positioned to contact the SMP apparatus 12, as later described herein. The support apparatus 10 may be configured and operated the same or similar to the support apparatus described in some embodiments of co-pending U.S. application Ser. Nos. 13/246,332; 13/246,377; and 13/246,414, each incorporated herein by reference in their entirety. However, the deployable or inflatable SMP cells of those incorporated applications may be replaced with the shapeable or deformable SMP support components 18 described herein.

The rigid structural member 16 of the support apparatus 10 may be formed of rigid materials, such as steel, and may be configured and/or reconfigured to resist bending or breaking under various structural loads applied to molds and tools during composite part manufacturing. Furthermore, the rigid structural member 16 may be configured to mechanically increase and decrease in at least one cross-sectional dimension, such as diameter or area, pressing the SMP support components 18 toward or away from the SMP apparatus 12.

For example, as illustrated in FIGS. 1-2, the rigid structural member 16 may include a plurality of spokes 22 arranged around a center frame piece 24. The spokes 22 may be telescoping or otherwise mechanically adjustable to extend or retract in length. In this way, the spokes 22 may be configured to adjust toward and/or away from the SMP apparatus 12. Adjustment of the spokes 22 may be manual or automated via hydraulic or electro-mechanical actuators.

The SMP support components 18 may be attached to any surface of the rigid structural member 16 by way of various adhesives, attachment components, and/or by way of various curing methods. For example, as illustrated in FIGS. 1-2, the SMP support components 18 may each be fixed at an end of one of the spokes 22 of the rigid structural member 16. In some embodiments of the invention, the SMP support components 18 are attached to the rigid structural member 16 such that they remain attached during their malleable and rigid states. In other embodiments of the invention, the SMP support components 18 may be attached to the rigid structural member 16 after being shaped in a malleable state and then re-hardened.

Figure 5:
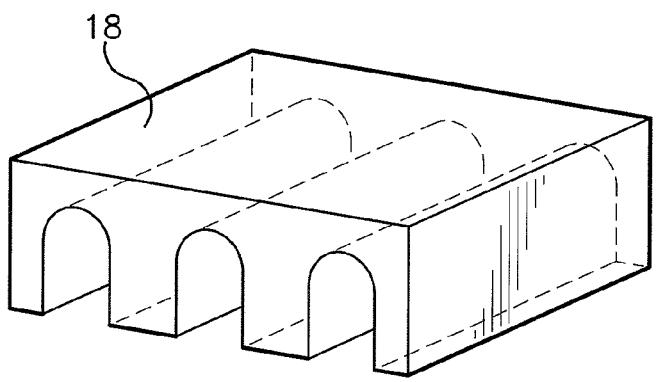
FIG. 5 is a perspective view of an alternative embodiment of the SMP support component of FIG. 1 having an alternate shape.
Figure 6:
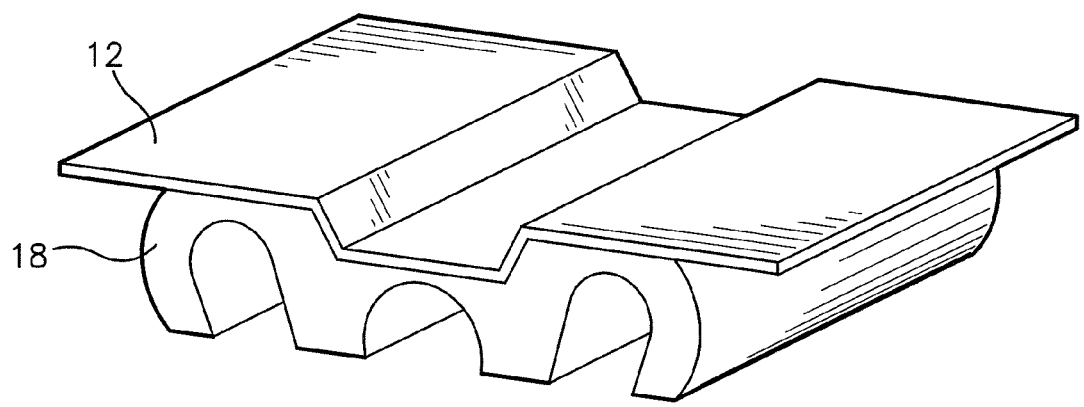
FIG. 6 is a perspective view of the SMP support component of FIG. 5 being deformed with a mold or SMP apparatus.

The SMP support components 18 may be at least partially composed of SMP material and may have any of the SMP material properties and qualities described above for the SMP apparatus 12 or described in the incorporated references. For example, the SMP support components 18 may comprise non-reinforced or reinforced SMP material and may be changed from a rigid state to a malleable or deformable state when a particular trigger, such as sufficient heat, is applied thereto. The SMP support components 18 may have symmetric or asymmetric shapes, such as a sheet, rod, tube, ball, sphere, hemisphere, block, ellipsoid, or any other shape. In one example embodiment of the invention, as illustrated in FIGS. 5 and 6, the SMP support components 18 may be fabricated to include internal or backside grooves or channels that enable ease of reconfiguration while minimizing internal stresses on the materials.

Figure 3:
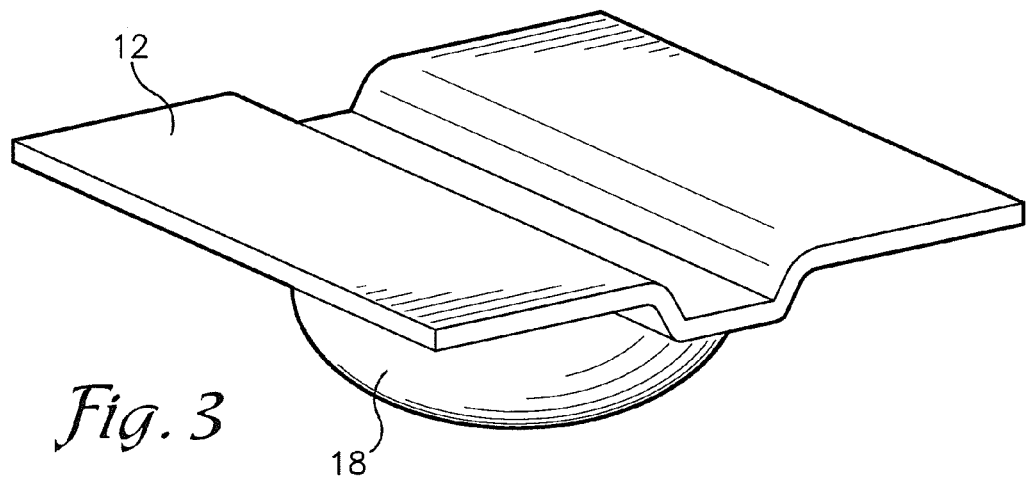
FIG. 3 is a perspective view of a mold or rigid SMP apparatus pressing into an SMP support component of the support apparatus of FIG. 1 when the SMP support component is in a malleable state.
Figure 4:
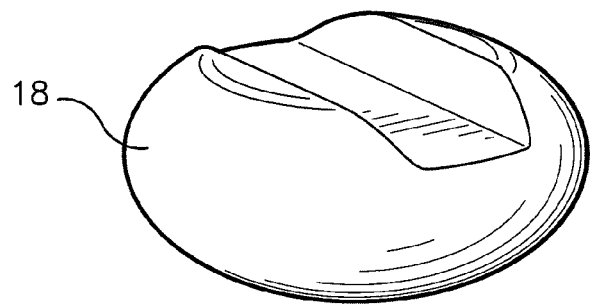
FIG. 4 is a perspective view of the SMP support component of FIG. 3 in a rigid state after being deformed to the SMP apparatus.

The SMP support components 18 may also each be configured to independently deform from a first configuration into a second configuration when triggered into a malleable state and pressed against the SMP apparatus 12. For example, the SMP support components 18 may be substantially spherical in a first configuration, but may be pressed into a substantially ellipsoid-shaped SMP support components 18 in the second configuration, as illustrated in FIGS. 3 and 4. Furthermore, depending on various protrusions and indentions of the SMP apparatus 12 or other molding tools used, the SMP support components 18 may have channels or other such indentions formed therein in the second configuration, as also illustrated in FIGS. 3 and 4.

Figure 7:
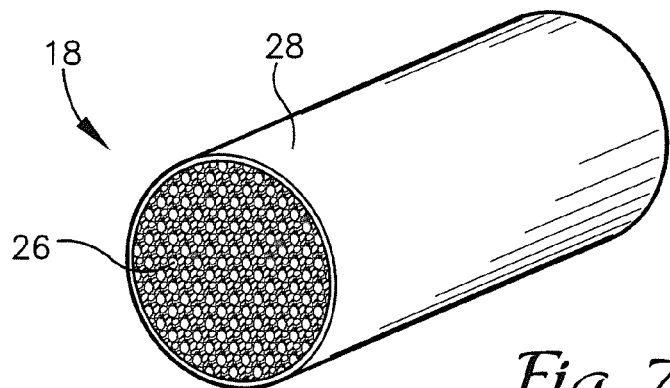
FIG. 7 is a cross-sectional perspective view of another alternative embodiment of the SMP support component having a particulate filling.
Figure 8:
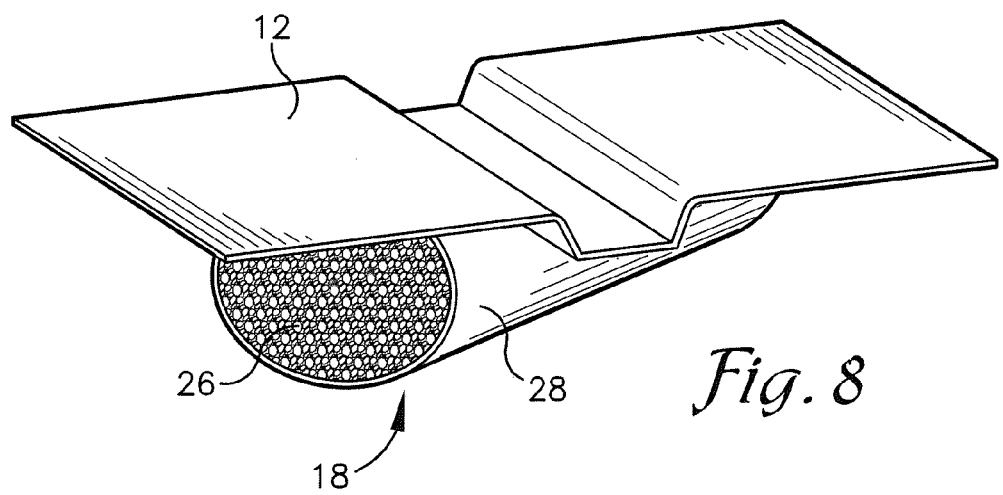
FIG. 8 is a perspective view of the SMP support component of FIG. 7 being deformed with a mold or SMP apparatus.
Figure 9:
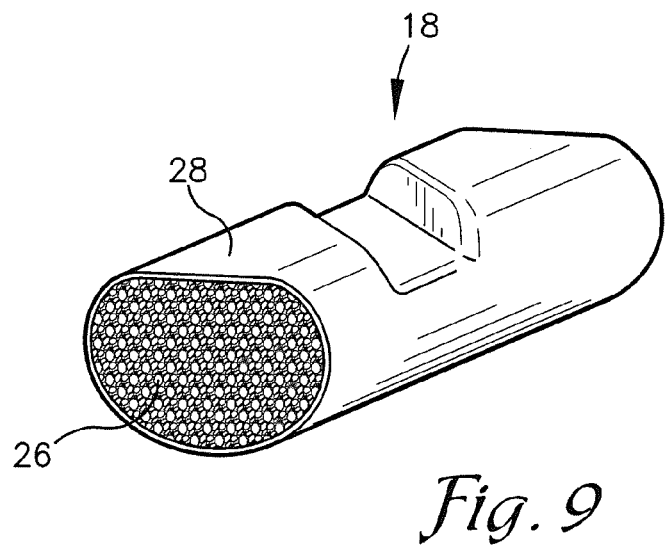
FIG. 9 is a cross-sectional perspective view of the SMP support component of FIG. 8 in a rigid state after being deformed by the SMP apparatus.

The SMP support components 18 may be a solid piece of SMP material, a hollow piece of SMP material, and/or a hollow shell or skin of SMP material filled with particulate, as described below. For example, the SMP support components 18 may be substantially solid and comprise SMP material throughout which may be deformed when triggered to the malleable state. In some alternative embodiments of the invention, as illustrated in FIGS. 7-9, the SMP support components 18 may include an outer shell 28 of SMP material with particulate 26 housed therein and/or one or more hollow spaces formed therein to accommodate or assist in shaping or shape fixing. The particulate 26 may be solid, hollow, and/or filled with a solid, gas, or secondary particulate. For example, the particulate 26 may be sand, macrolite, or any particulate known in the art. The outer shell 28 may be sealed or unsealed. In the sealed configuration, a pressure differential may be introduced, such as via pressurized gas or vacuum evacuation of air therein. This pressure differential may assist in more tightly packing the particulate 26 within the outer shell 28 in whatever configuration the SMP support component 18 is being shaped or molded into. Pressure differentials may also be applied to the SMP support components 18 by heating or cooling of gas, liquid, solids, and particulates 26.

Figure 10:
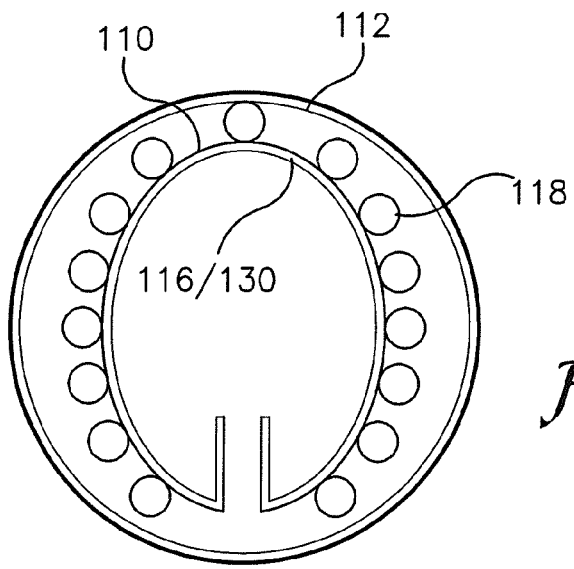
FIG. 10 is an end view of a support apparatus constructed in accordance with an alternative embodiment of the present invention and illustrated in a first configuration.
Figure 11:
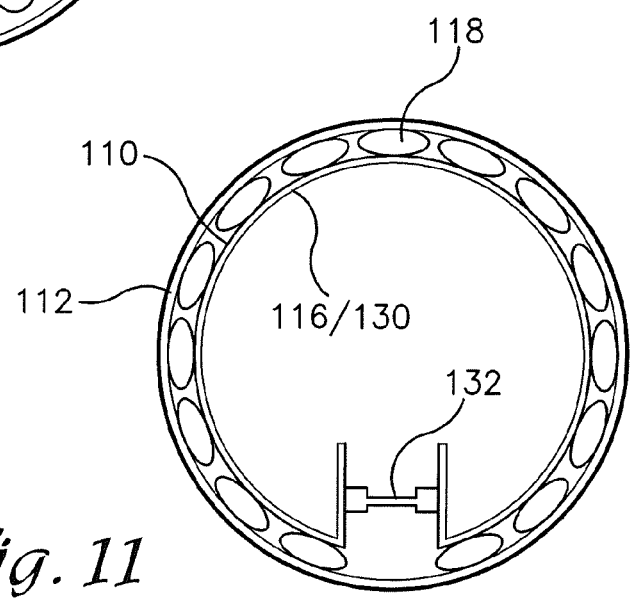
FIG. 11 is an end view of the support apparatus of FIG. 10 in a second configuration.

A support apparatus 110 constructed in accordance with an alternative embodiment of the invention is illustrated in FIGS. 10 and 11. The support apparatus 110 is similar to the support apparatus 10 described above, comprising a rigid structural member 116 and a plurality of SMP support components 118 to structurally support an SMP apparatus 112. The SMP apparatus 112 may have the same features as the SMP apparatus 12 described above. The rigid structural member 116 may be composed of the same or similar materials as the rigid structural member 16 described above, but may mechanically increase and decrease in cross-sectional dimension by flexing inward or outward.

Specifically, the rigid structural member 116 may comprise an inner mandrel 130, which may be a split cylinder, tube, or pipe having a substantially "C"-shaped or split-ring cross-section which may be configured to flex when edges thereof are squeezed together and/or forced apart from each other. The rigid structural member 116 may also comprise at least one spacer piece 132 configured to fit between the two edges, length-wise, of the inner mandrel 130 and impede the flexing thereof. For example, the spacer piece 132 may be a rigid component with a fixed width configured to be wedged between two flanges of the inner mandrel 130. The flanges may be integral with the two length-wise edges of the inner mandrel 130. Alternatively, the spacer piece 132 may have an extendable length or width and may be actuated to extend its length or width while placed between the two flanges of the inner mandrel 130. This may allow the rigid structural member 116 of FIGS. 10 and 11 to increase in cross-sectional diameter or area by varying amounts, depending on the application.

The SMP support components 118 have the same features and characteristics as the SMP support components 18 described above, and may be attached to the rigid structural member 116 using any of the methods described above. However, instead of attaching to spoke ends, as in FIGS. 1 and 2, the SMP support components 218 may be distributed across a surface of the rigid structural member 216 in any pattern or configuration at regular or varied intervals, as illustrated in FIGS. 10 and 11.

Figure 12:
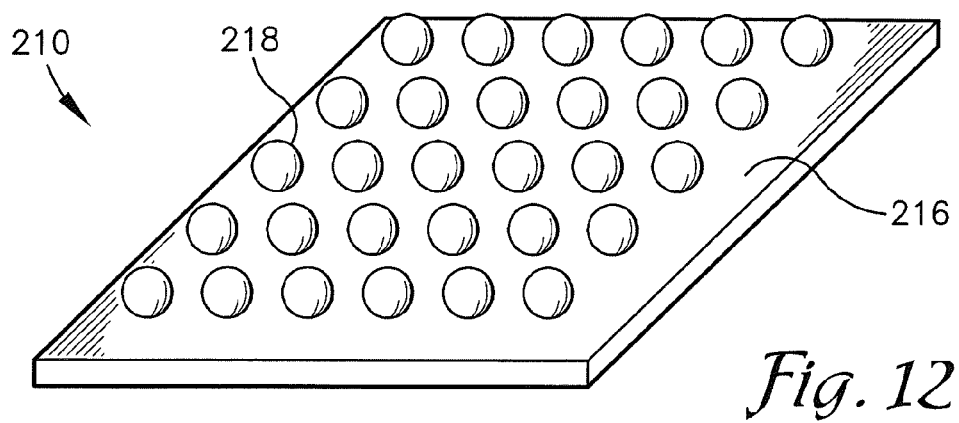
FIG. 12 is a perspective view of a support apparatus constructed in accordance with another alternative embodiment of the present invention.
Figure 13:
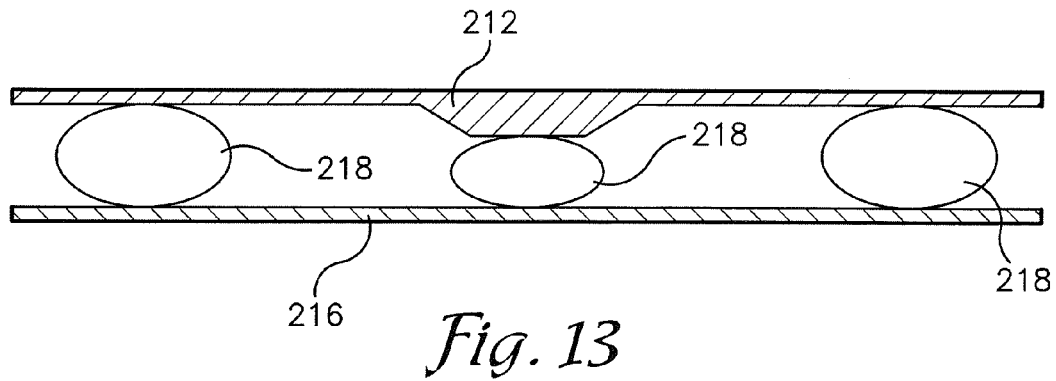
FIG. 13 is a fragmentary cross-sectional view of the support apparatus of FIG. 12 pressed against an SMP tooling apparatus.

A support apparatus 210 constructed in accordance with another alternative embodiment of the invention is illustrated in FIGS. 12 and 13. The support apparatus 210 is similar to the support apparatus 10 described above and may comprise a rigid structural member 216 and a plurality of SMP support components 218 attached to an outer surface thereof. However, in this embodiment of the invention, the rigid structural member 216 may be a rigid sheet of material having any size, shape, and configuration to resist bending or breaking under various structural loads applied to molds and tools during composite part manufacturing. The support apparatus 210 may be actuated toward an SMP apparatus 212 or, alternatively, the SMP apparatus 212 may be actuated toward the rigid structural member 216 for deforming the SMP support components 218. Note that the SMP apparatus 212 may also have the same characteristics as the SMP apparatus 12 described above. Similar to the embodiments of the invention depicted in FIGS. 10 and 11, the SMP support components 218 may also be distributed across a surface of the rigid structural member 316 in any pattern or configuration at regular or varied intervals, as illustrated in FIGS. 12 and 13.

The following paragraphs disclose various method steps and uses of the structures described above. Although these paragraphs primarily reference support apparatus 10 illustrated in FIGS. 1 and 2, please note that the method steps and uses described herein may also apply to the support apparatus 110 illustrated in FIGS. 10 and 11 or the support apparatus 210 illustrated in FIGS. 12 and 13. Furthermore, the method steps and uses described herein may apply to other alternative embodiments of the support apparatus described above but not illustrated herein.

In use, the support apparatus 10 is received in or shaped into a first configuration, then is triggered and/or actuated into a second configuration in which the SMP support components 18 press against and conform to various surfaces of the SMP apparatus 12 (or other composite lay-up tooling). Next, the rigid structural member 16 is locked or otherwise rigidly secured in the second configuration. The uncured composite material 14, as illustrated in FIGS. 1 and 2, may then be applied to a surface of the SMP apparatus 12 that is opposite of the surface of the SMP apparatus 12 contacting the SMP support components 18. Note that other items to be co-cured or co-bonded to the uncured composite material 14 may also be applied to the SMP apparatus 12, such as frames and stringers to be integrated into a fuselage. Then the uncured composite material 14 may be cured into a rigid, cured composite part. Finally, the support apparatus 10 may be triggered and/or actuated back into a smaller cross-sectional dimension and removed from the SMP apparatus 12 and/or the cured composite part. However, in some embodiments of the invention, the support apparatus 10 does not have to be removed from the SMP apparatus 12.

Figure 14:
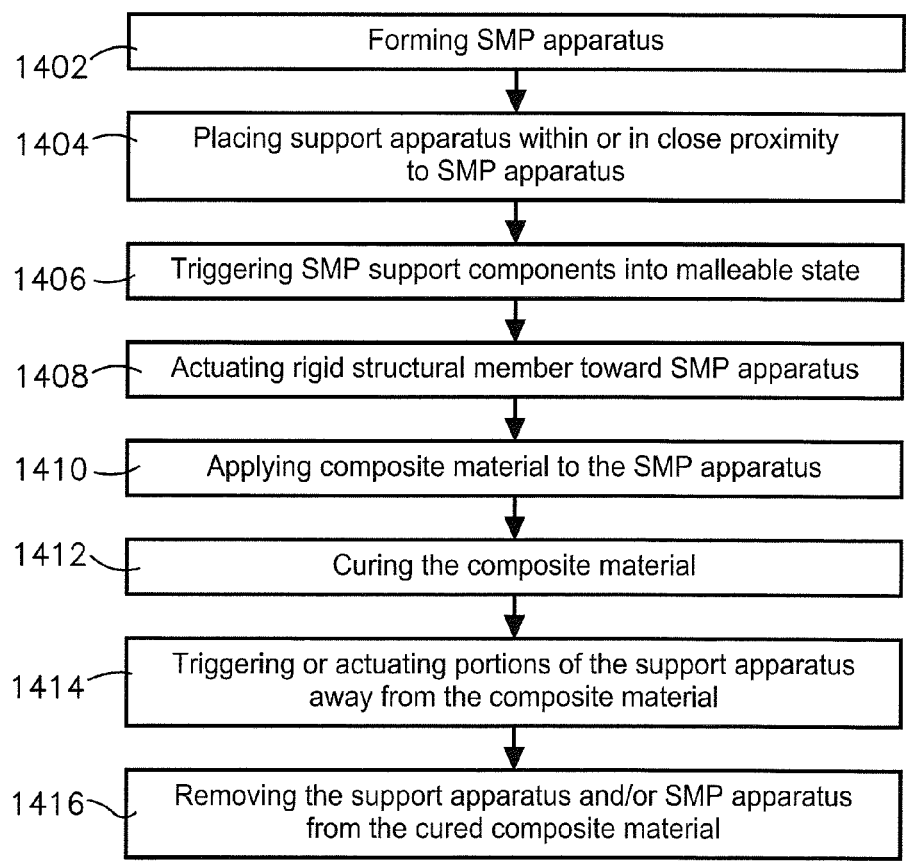
FIG. 14 is a flow chart of a method of forming a composite part in accordance with an embodiment of the present invention.

The flow chart of FIG. 14 depicts the steps of an exemplary method 1400 for fabricating a composite part using the support apparatus 10. In some alternative implementations, the functions noted in the various blocks may occur out of the order depicted in FIG. 14. For example, two blocks shown in succession in FIG. 14 may in fact be executed substantially concurrently, or the blocks may sometimes be executed in the reverse order or any alternative order depending upon the functionality involved. Furthermore, while the method 1400 describes use of the support apparatus 10, these steps may also be used with the support apparatus 110 or the support apparatus 210 without departing from the scope of the invention.

The method 1400 for fabricating the composite part may first include the step of forming a mold or the SMP apparatus 12 into a desired configuration, as depicted in block 1402. For example, various methods of forming the SMP apparatus 12 are described in the following co-pending U.S. Patent Applications, as incorporated by reference above: U.S. application Ser. No. 13/238,695; U.S. application Ser. No. 13/238,879; U.S. application Ser. No. 13/238,733; U.S. application Ser. No. 13/238,841, and U.S. application Ser. No. 13/238,775. Next, the method 1400 may include the steps of placing the support apparatus 10 proximate to and/or within the SMP apparatus 12, as depicted in block 1404, triggering the SMP support components 18 into their malleable state, as depicted in block 1406, and actuating the rigid structural member 16 toward the SMP apparatus 12 (or vice versa), as depicted in block 1408, such that the SMP support components 18 are sandwiched between the SMP apparatus 12 and the rigid structural member 16. Steps 1406 and 1408 allow the SMP support components 18 to conform to at least one surface of the SMP apparatus 12. Specifically, steps 1406 and 1408 change the support apparatus 10 from its first configuration into its second configuration, as described above.

Note that in some embodiments of the invention, step 1404 of placing the support apparatus 10 may take place before step 1402 of forming the SMP apparatus 12. For example, the SMP apparatus 12 may be triggered to a malleable state and pressed against a mold surface in step 1402 simultaneously while the SMP support components 18 are pressed against the SMP apparatus 12 in steps 1406 and 1408. In some embodiments of the invention, the SMP apparatus 12 is at least partially pressed against the mold surface in step 1402 by the SMP support components 18 via actuation of the rigid structural member 16. The order in which these steps are performed may depend on the material used for the SMP apparatus 12 and the SMP support components 18 and whether or not they have the same trigger or same trigger temperature $T_g$ or if one can be rigid while the other is malleable.

In some embodiments of the invention, if the mold, tooling, or SMP apparatus 12 to be supported by the support apparatus 10 is particularly delicate, a separate forming jig or mold may be used to impart the shape onto the SMP support components 18. The SMP support components 18 may be pre-formed prior to operation and then subsequently installed onto or within the mold, tooling, or SMP apparatus 12 to which the composite material 14 is to be applied. Additionally or alternatively, the SMP apparatus 12 may be supported by a rigid backing structure such as a rigid outer tool during steps 1406 and 1408 to counter the force needed to form the SMP support components 18.

Next, the method 1400 may include applying composite material 14 to the SMP apparatus 12, as depicted in block 1410. This may be accomplished by way of composite lay-up, tape laying, or any composite material application process known in the art. For example, when the support apparatus is in its second configuration, the SMP support components 18 may be in contact with a first surface of the SMP apparatus 12 while the composite material 14 is applied to a second surface of the SMP apparatus 12 that is opposite of the first surface of the SMP apparatus 12.

The method 1400 may then include the steps of curing the composite material 14, as depicted in block 1412, triggering and/or actuating various portions of the support apparatus 10 away from the resulting cured composite part, as depicted in block 1414, and removing the support apparatus 10 and/or the SMP apparatus 12 from the cured composite part, as depicted in block 1416. Step 1414 may be accomplished by actuating the rigid structural member 16 away from the cured composite material 14 into or toward the first configuration in which the rigid structural member 16 has a smaller cross-sectional dimension (i.e., diameter, width, area, etc.). Actuating the rigid structural member 16 away from the cured composite material may offer greater clearance for removal thereof and/or eliminate locking fixture geometries that would otherwise not allow release of the support apparatus 10 from within the cured composite part.

The step of actuating the rigid structural member 16 to decrease in cross-sectional dimension may include, for example, retracting the extended telescoping spokes 22 toward the center frame piece 24. Likewise, the same method 1400 may be used with the support apparatus 110, as illustrated in FIGS. 10 and 11, but the step of actuating the rigid structural member 16 to decrease in cross-section may be performed by removing the spacer piece 132 from the split mandrel 130.

Furthermore, step 1414 may also include triggering the SMP support components 18 into the malleable state. However, in some embodiments of the invention, the SMP support components 18 may retain the shape of their second configuration to be used in forming subsequent identical composite parts. The SMP apparatus 12 may also be triggered into its malleable state, allowing both the support apparatus 10 and the SMP apparatus 12 to be removed from the composite part, as depicted in block 1416.

Although the invention has been described with reference to the preferred embodiment illustrated in the attached drawing figures, it is noted that equivalents may be employed and substitutions made herein without departing from the scope of the invention as recited in the claims. Specifically, in some embodiments of the invention, the SMP apparatus 12 may be replaced with other mandrels and tooling without departing from the scope of the invention. For example, the support apparatus 10 may be used as described above to provide structural support to non-SMP hollow mandrels or other various tooling used in composite material lay-up.

Furthermore, though the figures and example embodiments provided herein describe fabricating composite parts for aircrafts, the forming tools and methods described herein may be used to fabricate composite parts for automobiles, boats, sporting goods, and the like without departing from the scope of the invention. Specifically, the support apparatus 10 and the SMP apparatus 12 may be used to fabricate and structurally support composite parts for aircraft fuselage, nacelles, wings, boat hulls and decks, bridge decks, bulkheads, automobile and truck chassis, trailers, air ducts, exterior body panels, and the like. Furthermore, the support apparatus 10 and the SMP apparatus 12 may be used to fabricate and structurally support composite structures with integrated stiffening structures such as ribs, frames, longerons, stringers, beads, crimps, shear webs, box structures, and the like, as described in co-pending U.S. Patent Applications: U.S. application Ser. No. 13/238,695; U.S. application Ser. No. 13/238,879; U.S. application Ser. No. 13/238,733; U.S. application Ser. No. 13/238,841, and U.S. application Ser. No. 13/238,775, incorporated by reference herein above.

Having thus described various embodiments of the invention, what is claimed as new and desired to be protected by Letters Patent includes the following:

1. A support apparatus configured for providing structural support to any apparatus, mold, tooling, or shape memory polymer (SMP) apparatus for forming composite parts, the support apparatus comprising:

an adjustable, rigid structural member having adjustable cross-sectional dimensions, wherein the rigid structural member comprises an inner mandrel having a substantially "C"-shaped or split-ring cross-section configured to flex when edges thereof are squeezed together or forced apart from each other; and a plurality of shape memory polymer (SMP) support components comprising shape memory polymer, each spaced apart from each other and fixed to an outer surface or end portion of the adjustable rigid structural member, wherein the SMP support components are configured to transition between a rigid state and a malleable state and to be independently deformable in the malleable state when pressure is applied thereto.

2. The support apparatus of claim 1, wherein the SMP support components are configured to be in the rigid state at a temperature below $T_g$ and to become malleable at a temperature above $T_g$.

3. The support apparatus of claim 1, wherein the rigid structural member further comprises a spacer piece configured to be inserted between the two edges, length-wise, of the inner mandrel and to actuate the inner mandrel to flex outward, thereby increasing the cross-sectional area within the inner mandrel.

4. The support apparatus of claim 1, wherein the SMP support components are solid pieces of SMP material.

5. The support apparatus of claim 1, wherein the SMP support components comprise a hollow outer shell or skin of SMP material filled with particulate.

6. The support apparatus of claim 5, wherein the particulate is solid, hollow, or filled with a solid, gas, or secondary particulate.

7. A method of forming a composite part on an SMP apparatus composed of shape memory polymer (SMP) and having a first surface and a second surface opposite the first surface, the method comprising:

placing a support apparatus proximate to at least one surface of the SMP apparatus, wherein the support apparatus comprises:

an adjustable, rigid structural member having mechanically adjustable cross-sectional dimensions, wherein the rigid structural member is adjustable between a first configuration and a second configuration, wherein at least one of the cross-sectional dimensions of the rigid structural member is greater in the second configuration than in the first configuration, and a plurality of shape memory polymer (SMP) support components comprising shape memory polymer, each spaced apart from each other and fixed to an outer surface or end portion of the adjustable rigid structural member, wherein the SMP support components are configured to transition between a rigid state and a malleable state and to be independently deformable in the malleable state when mechanical force is applied thereto, wherein the SMP support components are configured to be in the rigid state at a temperature below $T_g$ and to begin changing to the malleable state at a temperature above $T_g$;

triggering the SMP support components from the rigid state into the malleable state;

actuating the rigid structural member to increase in at least one cross-sectional dimension, such that the SMP support components are pressed against at least one surface of the SMP apparatus;

triggering the SMP support components from the malleable state to the rigid state while the SMP support components are pressed against the at least one surface of the SMP apparatus, thus providing a rigid load path between the SMP apparatus and the rigid structural member; and applying uncured composite material to a surface of the SMP apparatus opposite of the at least one surface of the SMP apparatus in contact with the SMP support components.

8. The method of claim 7, wherein the SMP support components are in the rigid state at temperatures below $T_g$ and are actuated into the malleable state when heated above $T_g$.

9. The method of claim 7, further comprising extending or retracting rods of the rigid structural member to place the SMP support components in contact with the SMP apparatus.

10. The method of claim 7, wherein the rigid structural member comprises an inner mandrel having a substantially "C"-shaped or split-ring cross-section configured to flex when edges thereof are squeezed together or forced apart from each other.

11. The method of claim 10, further comprising inserting a spacer piece between the two edges, length-wise, of the inner mandrel, such that the inner mandrel flexes outward, thereby increasing the cross-sectional area within the inner mandrel.

12. The method of claim 7, further comprising:
curing the composite material to form the composite part;
actuating the rigid structural member to decrease in at least one cross-sectional dimension; and
removing the support apparatus and the SMP apparatus from the composite part.

13. The method of claim 7, wherein the SMP support components are solid pieces of SMP material.

14. The method of claim 7, wherein the SMP support components comprise a hollow outer shell or skin of SMP material filled with particulate.

15. The method of claim 14, wherein the particulate is solid, hollow, or filled with a solid, gas, or secondary particulate.

16. A support apparatus configured for providing structural support for forming composite parts, the support apparatus comprising:
an adjustable, rigid structural member having mechanically adjustable cross-sectional dimensions, wherein the rigid structural member is adjustable between a first configuration and a second configuration, wherein at least one of the cross-sectional dimensions of the rigid structural member is greater in the second configuration than in the first configuration;
a plurality of shape memory polymer (SMP) support components comprising shape memory polymer, each spaced apart from each other and fixed to an outer surface or end portion of the adjustable rigid structural member, wherein the SMP support components are configured to transition between a rigid state and a malleable state and to be independently deformable in the malleable state when mechanical force is applied thereto, wherein the SMP support components are configured to be in the rigid state at a temperature below $T_g$ and to begin changing to the malleable state at a temperature above $T_g$; and
an SMP apparatus made of SMP material having a first surface and a second surface opposite the first surface, wherein the second surface is configured to have uncured composite material applied thereto, wherein at least some of the plurality of SMP support components are pressed against the first surface of the SMP apparatus when the rigid structural member is in the second configuration, such that the SMP support components provide a structural load path from the SMP apparatus to the rigid structural member.

17. The support apparatus of claim 16, wherein the rigid structural member comprises a centerframe piece and mechanically extendible spokes attached to the center frame piece, wherein the SMP support components are attached to ends of the spokes and the spokes are configured to actuate between a first length in the first configuration and a second length in the second configuration, wherein the first length is shorter than the second length.

18. The support apparatus of claim 16, wherein the rigid structural member comprises an inner mandrel having a substantially "C"-shaped or split-ring cross-section configured to flex when edges thereof are squeezed together or forced apart from each other, wherein the rigid structural member further comprises a spacer piece configured to be inserted between the two edges, length-wise, of the inner mandrel and to actuate the inner mandrel to flex outward, thereby increasing the cross-sectional area within the inner mandrel and placing the rigid structural member in the second configuration.

19. The support apparatus of claim 16, wherein the SMP support components are solid pieces of SMP material.

20. The support apparatus of claim 16, wherein the SMP support components comprise a hollow outer shell or skin of SMP material filled with particulate.

21. A support apparatus configured for providing structural support to any apparatus, mold, tooling, or shape memory polymer (SMP) apparatus for forming composite parts, the support apparatus comprising:
an adjustable, rigid structural member having adjustable cross-sectional dimensions, wherein the rigid structural member comprises a center frame piece and extendible spokes attached to the center frame piece, wherein the SMP support components are attached to ends of the spokes and the spokes are configured to actuate between a plurality of lengths; and
a plurality of shape memory polymer (SMP) support components comprising shape memory polymer, each spaced apart from each other and fixed to an outer surface or end portion of the adjustable rigid structural member, wherein the SMP support components are configured to transition between a rigid state and a malleable state and to be independently deformable in the malleable state when pressure is applied thereto.

22. The support apparatus of claim 21, wherein the SMP support components are configured to be in the rigid state at a temperature below $T_g$ and to become malleable at a temperature above $T_g$.

23. The support apparatus of claim 21, wherein the SMP support components are solid pieces of SMP material.

24. The support apparatus of claim 21, wherein the SMP support components comprise a hollow outer shell or skin of SMP material filled with particulate.

25. The support apparatus of claim 24, wherein the particulate is solid, hollow, or filled with a solid, gas, or secondary particulate.

* * * * *